(12) United States Patent
Hahn

(10) Patent No.: US 12,085,839 B2
(45) Date of Patent: Sep. 10, 2024

(54) CAMERA MOUNT AND REFLECTOR SYSTEM

(71) Applicant: Paige E. Hahn, San Diego, CA (US)

(72) Inventor: Paige E. Hahn, San Diego, CA (US)

( * ) Notice: Subject to any disclaimer, the term of this patent is extended or adjusted under 35 U.S.C. 154(b) by 0 days.

(21) Appl. No.: 17/535,114

(22) Filed: Nov. 24, 2021

(65) Prior Publication Data

US 2023/0161230 A1    May 25, 2023

(51) Int. Cl.
| | |
|---|---|
| *G03B 15/06* | (2021.01) |
| *F16M 13/04* | (2006.01) |
| *F21V 7/18* | (2006.01) |
| *F21V 7/28* | (2018.01) |
| *F21V 9/08* | (2018.01) |
| *F21V 33/00* | (2006.01) |
| *G03B 17/56* | (2021.01) |
| *H04N 23/55* | (2023.01) |
| *H04N 23/66* | (2023.01) |

(52) U.S. Cl.
CPC ............. *G03B 15/06* (2013.01); *F16M 13/04* (2013.01); *F21V 7/18* (2013.01); *F21V 7/28* (2018.02); *F21V 9/08* (2013.01); *F21V 33/0052* (2013.01); *G03B 17/561* (2013.01); *H04N 23/55* (2023.01); *H04N 23/66* (2023.01); *G03B 2215/0535* (2013.01)

(58) Field of Classification Search
USPC ........................................................ 396/428
See application file for complete search history.

(56) References Cited

U.S. PATENT DOCUMENTS

2021/0022463 A1*  1/2021  Newcombe .............. A45B 3/00

FOREIGN PATENT DOCUMENTS

| CN | 205250582 U | * | 5/2016 |
|---|---|---|---|
| CN | 205336361 U | * | 6/2016 |
| CN | 207678979 U | * | 8/2018 |
| CN | 207927939 U | * | 10/2018 |
| CN | 209594933 U | * | 11/2019 |
| ES | 1191633 U | * | 9/2017 |
| KR | 102104427 B1 | * | 4/2020 |
| KR | 20200136284 A | * | 12/2020 |

* cited by examiner

*Primary Examiner* — Clayton E. LaBalle
*Assistant Examiner* — Warren K Fenwick
(74) *Attorney, Agent, or Firm* — Peter K. Hahn; Pillsbury Winthrop Shaw Pittman LLP

(57) ABSTRACT

This disclosure relates to a handheld camera mount and reflector system. The reflector system includes a collapsible rod member having a collapsible reflector attached at one end of the rod. A handle is connected at the other end of the rod. A camera mount is attached to the rod between the reflector and the handle. The surface of the reflector can be adapted to adjust reflectivity, diffusion and color spectrum.

11 Claims, 7 Drawing Sheets

CAMERA MOUNT AND REFLECTOR SYSTEM

FIELD OF THE DISCLOSURE

This disclosure relates to a camera mount system that includes a reflector to provide additional and/or diffused light to the camera subject of interest.

BACKGROUND

Camera mount systems are well known. Traditional camera mounts have been used for many years to provide a stable base for cameras. These camera mounts were particularly critical during times when cameras were large and bulky and difficult to manage. Over the years cameras have become smaller and more capable. In recent years cameras have become small enough to be pocket sized. Today, almost all cell phones include a camera.

Given the small size of today's cameras, they have found their way into many parts of people's lives. The cameras are easily brought to events like family outings, vacations, etc. This widespread use of small cameras has also led to the proliferation of camera mounts used in connection with these cameras. Many mounts are designed to be specifically used with these small cameras. While some small camera mounts are more traditional, including tabletop tripods and collapsing tripods that are pocket or backpack sized.

One of the unique camera mounts that have been developed solely for use with small cameras and especially cellphone-based cameras, are collapsible rod type camera mounts commonly referred to as "selfie-sticks". "Selfies" refer to photos taken by a camera user of themselves or with others. Selfie-sticks assist a user in taking selfies. Often selfies are taken to capture a moment where the user is with friends or in a particular place. It is common for the location where a selfie is taken to be determined by a particular scene that a user wants to be the background for the selfie.

A selfie-stick is generally a rod with a handle at one end and a camera mount at the other. The camera mount/holder can accommodate either a small camera or a cellphone-based camera. It is often adjustable relative to the rod allowing the camera to be adjusted into the desired position. In order to make the selfie-stick smaller, it is typical for the selfie-stick to include a rod that has telescoping sections. In this manner the selfie-stick has an open or extended position and a closed or retracted position. Selfie-sticks generally include a triggering mechanism that is in wireless communication with the camera or cell phone. This triggering mechanism can be a button built into the handle of the selfie-stick that is connected to a processor, transceiver and battery that provides a wireless signal that can be received by the camera or cell phone. Alternatively, some selfie-sticks include a separate independent key fob trigger unit that can be held by the user outside of the image to be taken. This key fob typically includes a button that likewise communicates with a processor, transceiver and battery to provide a wireless signal that can be received by the camera or cell phone. To take a photograph, the user first sets up the photograph by positioning the camera to a desired location facing the subject, and then presses the trigger either on the selfie-stick handle or on the key fob type trigger unit.

A common problem with selfies occurs when the background scene is brighter than the face or faces of the selfie subjects. This is commonly referred to as a backlit subject. While modern cameras are designed to manually or automatically adjust for these situations, the images often result in either the subjects being too dark or the background being washed out, i.e., too light.

But the problems associated with backlit subjects are not unique to selfie photography. These problems have been around for as long as cameras have been around. Early solutions to this problem relied primarily on the use of flash lighting systems. These systems were often bulky and unpredictable. Over the years flash systems have improved immensely. Today, most compact cameras and phone cameras include some kind of flash system. Many are processor controlled to specifically compensate for backlit subjects. While flash systems greatly improve backlit images, the flash system light sometimes appears unnatural or is sometimes too much for a particular situation. These flash systems can also result in "red eye" in subjects. In this situation the subject's eyes allow the camera lash to expose the inside of a subject's eye, which is red, and results in a red dot in the subject's pupil.

To avoid unnatural, excessive lighting and red eye, reflector type systems were developed to reflect the backlight back onto the forefront of the photo subject. These reflector systems were initially large screens that were positioned behind the camera and/or to the side of the camera. Overtime these reflector systems became more developed and included collapsible stands that could be used to hold and position the reflector systems.

As cameras became more and more capable and more electronic, the reflector systems often included lighting or flash systems positioned in front of and facing the reflector to provide additional reflected lighting for the photo subject. While initially the lighting/flash systems were physically connected or wired to the cameras, subsequent systems incorporated wireless communication between the camera and lighting/flash systems to provide instantaneous flashes synchronized with the photograph being taken. As these flash/reflector systems became more and more complicated, they also became more and more bulky. These systems expanded to not only include stands and reflectors, but also included a flash or lighting elements, cabling, wireless transceivers/processors, and often large battery packs for power.

While the complicated reflector/lighting systems are routinely used by professional photographers, they are ill-suited for traditional non-professional photography. As a result, and as noted above, camera manufacturers included technology in their cameras to provide fill-in flash capability that provided flash-based light to backlit subjects.

Another common lighting problem with selfies occurs when the camera subject of interest is facing the direct sunlight. This is caused when the camera subject of interest wants to position the selfie to capture a photograph where they are facing the direct sunlight. When shooting outdoors, the sun often creates overly bright highlights and harsh shadows on the skin. It may also cause eye discomfort for the camera subject of interest. This is not new to photography. Professional photographers use light diffusers in portrait photography. Placing the diffuser between the sun and the subject eliminates sun dappling on the subject, softens the sun's rays and corresponding shadows, and diffuses the light in a more balanced way, which creates even lighting that allows one to capture picture-perfect shots having a nice golden or other color adjusted tone. While the complicated reflector/lighting systems are routinely used by professional photographers, they are ill-suited for traditional non-professional photography. There is a need or a camera mount including a simple reflector/diffuser system suitable for use in connection with selfies.

SUMMARY

The present invention is an improved camera mount and reflector system. In one embodiment the system includes a rod member having a handle at one end. This rod member could include two or more telescoping members. At the other end is a reflector member. A camera mount is attached to the rod between the handle and the reflector member.

In some embodiments the reflector member includes a collapsible rib structure that supports a flexible cover that is configured to have an expanded configuration and a collapsed configuration. In other embodiments the reflector member includes a collapsible interconnected slat structure supporting a flexible cover that is configured to have an expanded configuration and a collapsed configuration. In some embodiments the side of the reflector member facing the camera mount and handle includes a reflective surface or coating. This reflective surface or coating is in some embodiments a reflective surface or coating on the flexible cover. In other embodiments the flexible cover of the reflector is adapted to diffuse light coming from the side of the reflector facing away from the camera mount and handle. In such embodiments the flexible cover allows only some of the light to pass through, the remainder is reflected back or absorbed.

In some embodiments the reflector member is configured to allow it to be in the expanded configuration when the rod member is in the extended configuration and the reflector member is configured to allow it to be in the collapsed configuration when the rod member is in the retracted configuration.

In other embodiments the reflector member comprises a reflector rod connected to the collapsing rib structure or the interconnected slat structure and a connector attaching the reflector rod to the telescoping rod.

Some embodiments of the system include a remote camera triggering system. Such a triggering system could be included in the handle or the rod member or it could be in a separate stand-alone housing.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

In the following paragraphs, implementations of the present disclosure will be described in detail by way of example with reference to the accompanying drawings, which are not necessarily drawn to scale, and the illustrated components are not necessarily drawn proportionately to one another. Throughout this description, the implementations and examples shown should be considered as exemplars, rather than as limitations on the present disclosure. As used herein, the "present disclosure" refers to any one of the embodiments of the disclosure described herein, and any equivalents. Furthermore, reference to various aspects of the disclosure throughout this document does not mean that all claimed embodiments or methods must include the referenced aspects.

Figure 1:
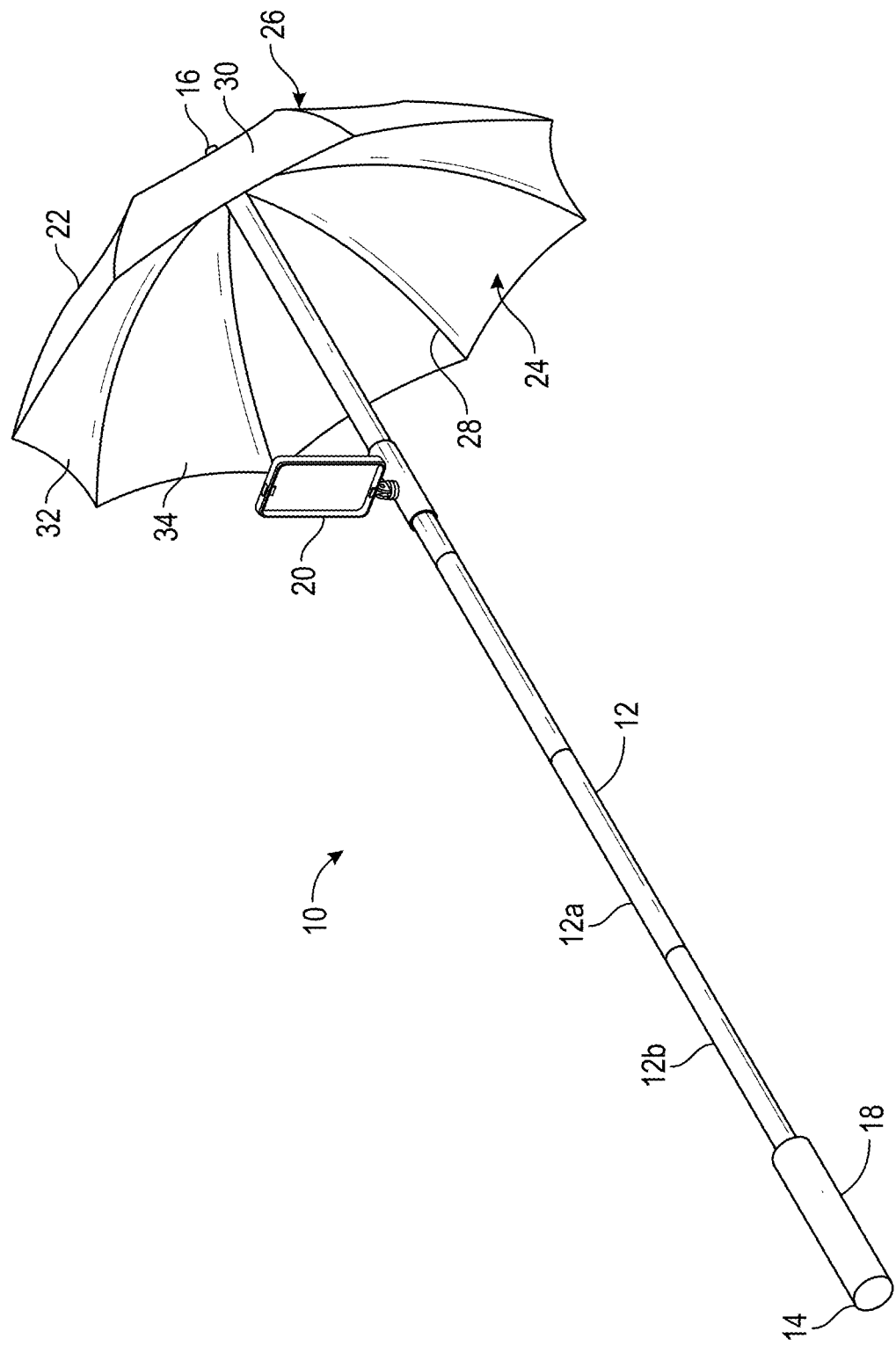
FIG. 1 illustrates one embodiment of a camera mount and reflector system of the present invention showing the system in the expanded configuration.

FIG. 1 illustrates an embodiment of the handheld camera mount and reflector system 10 of the present invention. Reflector system 10 includes a rod member 12 which has a proximal end 14 and a distal end 16. Rod member 12 could be a solid or fixed length rod, but it is preferably a collapsible rod. In some preferred embodiments rod member 12 is hollow. In other preferred embodiments rod member 12 includes two or more nested or telescoping sections 12a, 12b. In this manner rod member 12 can have a collapsed configuration and an extended configuration such that the overall length of the rod member 12 is minimized when in the collapsed configuration. Those skilled in the art will appreciate that the telescoping rod member 12 could be replaced with other known collapsible structures known in the art without departing from the present invention.

In a preferred embodiment a handle 18 is attached to the rod member adjacent the proximal end 14 of the rod member 12. Handle 18 is configured to facilitate a user being able to grip and maintain control of the reflector system 10. Handle 18 can include other complimentary systems like a trigger system or a pairing/syncing system. These aspects will be discussed further below.

Preferably a camera mount 20 is attached to rod member 12 between the proximal end 14 and the distal end 16. It is preferable that camera mount 20 is located as far from the proximal end 14 as possible without interfering with placement and functionality of other structures and components. The camera mount 20 can be fixedly or removably attached to rod member 12 and will be described in more detail below.

Also attached to rod member 12 adjacent to distal end 16 is a reflector 22 having a proximal side 24 and a distal side 26. In the preferred embodiment, reflector 22 is umbrella-like with ribs 28 to provide structure and a flexible cover 30. Preferably, reflector 22 is configured to be collapsible and has a collapsed configuration and an expanded configuration. Preferably the structure and collapsing functionality are like those known to and used by those the skilled in the art for umbrellas. In the preferred embodiment the surface 32 of the proximal side 24 of reflector 22 is reflective to visible light. To achieve this reflectiveness the flexible cover 30 itself can have a reflective surface 32. In some embodiments cover 30 could be a reflective, flexible plastic film like aluminized plastic or biaxially-oriented polyethylene terephthalate (PET) film with a metallic coating. Alternatively, a reflective coating 34 can be applied to the surface of cover 30. In the preferred embodiment the cover 30 is made of cloth material having one or more reflective coatings 34 applied to the proximal side 24. Preferably the reflective coating 34 is flexible to allow the reflector 22 to collapse into its collapsed configuration. In some embodiments cover 30 is adapted to reflect light is some portions of the visible spectrum and not others. In this manner the color of the light being reflected can be adjusted.

In other embodiments the flexible cover of the reflector is adapted to diffuse light coming from the side of the reflector facing away from the camera mount and handle. In such embodiments the flexible cover allows only some of the light to pass through, the remainder is reflected back or absorbed. In some embodiments a diffuser cover can allow between 10% and 90%. In preferred embodiments between 15% and 40% of light is allowed to pass through. In some embodiments materials can be selected to allow a predetermined color spectrum to pass through or be emphasized so that both the amount of light and the color of light passing through can be adjusted and controlled. In some embodiments the diffuser cover could be a reflective, flexible plastic film like aluminized plastic or biaxially-oriented polyethylene terephthalate (PET) film with a metallic coating. Alternatively, a reflective coating can be applied to the surface of a diffuser cover. In the preferred embodiment the diffuser cover is made of cloth material having one or more reflective coatings applied to the distal side of the diffuser cover.

Figure 2A:
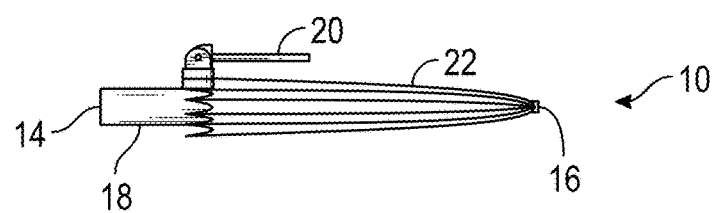
FIGS. 2a, 2b and 2c illustrate one embodiment of a camera mount and reflector system of the present invention in the collapsed, extended and expanded configurations, respectively.
Figure 2B:
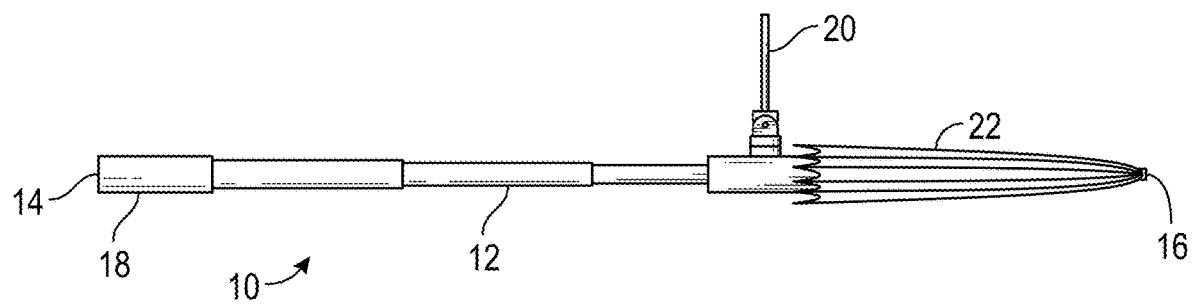
Figure 2C:
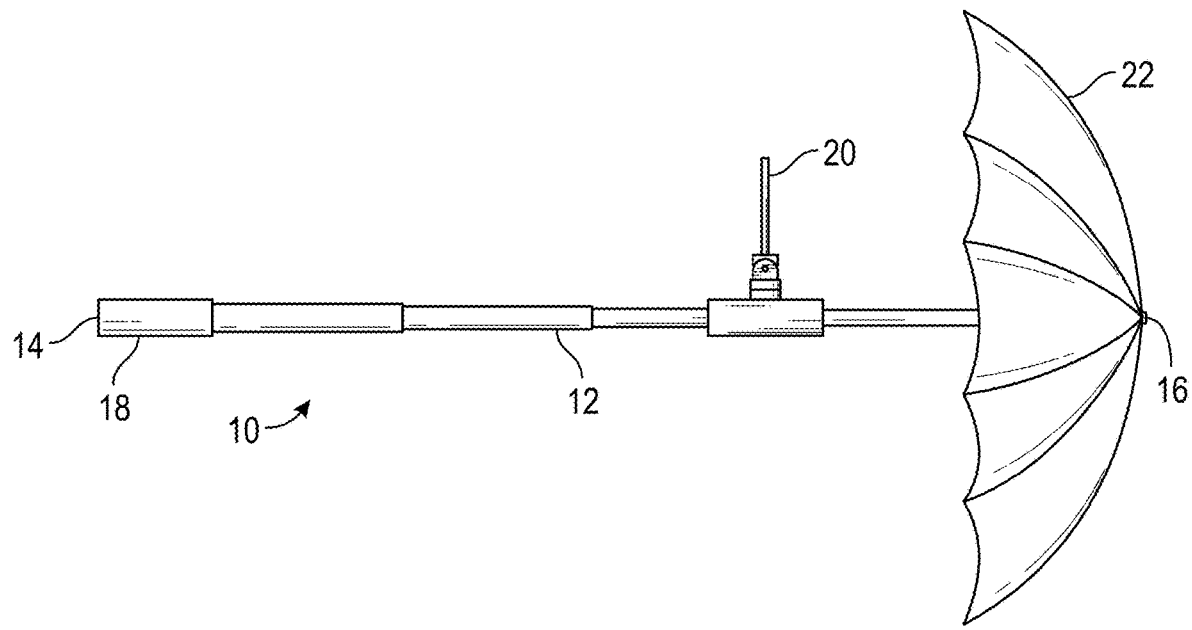

FIGS. 2a, 2b and 2c illustrate one embodiment of a camera mount and reflector system of the present invention in the collapsed, extended and expanded configurations, respectively. In FIG. 2a, reflector system 10 is shown in its fully collapsed configuration with rod 12 in its collapsed configuration and reflector 22 in its collapsed configuration. In FIG. 2b, reflector system 10 is shown with rod 12 in its extended configuration and reflector 22 in its collapsed configuration. In FIG. 2c, reflector system 10 is shown in its fully expanded configuration with rod 12 in its extended configuration and reflector 22 in its expanded configuration.

Figure 3A:
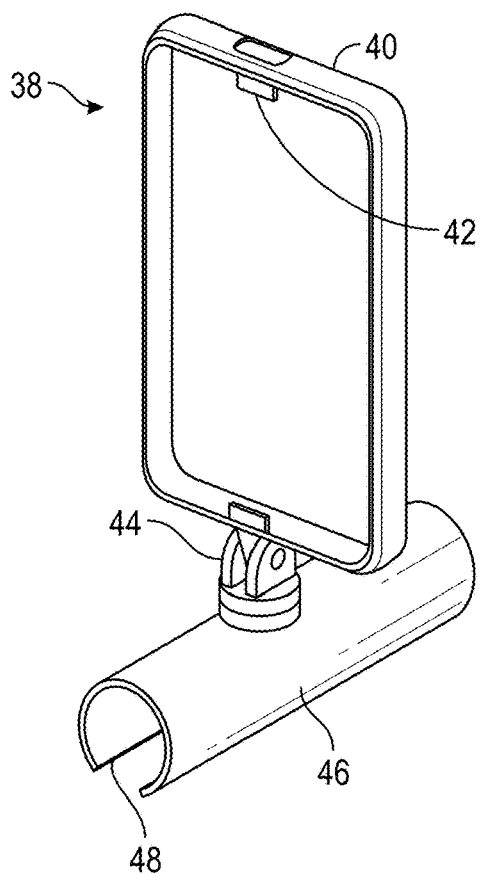
FIGS. 3a and 3b illustrate one embodiment of a camera mount of the camera mount and reflector system of the present invention in the disconnected and connected configurations, respectively.
Figure 3B:
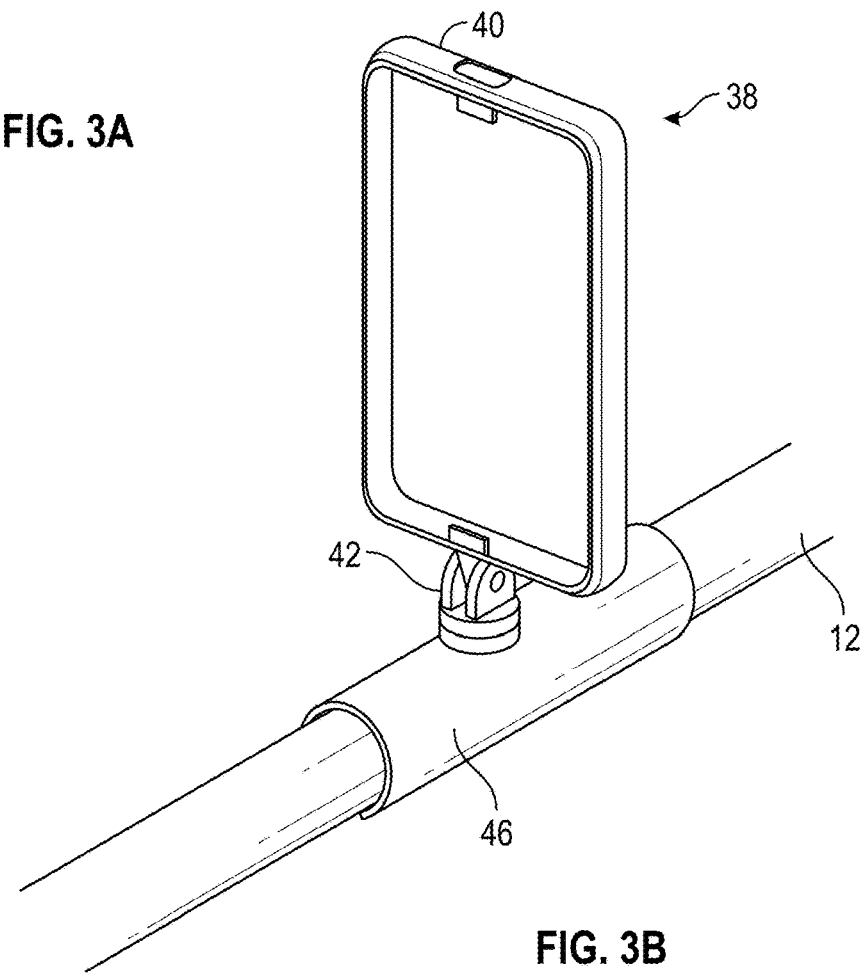

FIGS. 3a and 3b illustrate one embodiment of a camera mount of the camera mount and reflector system of the present invention in the disconnected and connected configurations, respectively. In FIG. 3a a removable camera mount 38 is shown which could be part of an embodiment of the present invention. FIG. 3b shows mount 38 attached to rod 12 of the present invention. Mount 38 includes a camera receiver 40 for releaseably retaining a camera, smartphone, etc. Camera receivers are well known to those skilled in the art. Receiver 40 can be box-like and made of plastic or rubber into which the camera or smartphone is inserted. Box-like receiver 40 can include retaining tabs 42 to retain the camera or smartphone. Receiver 40 could also be of a type that includes elastic loops that can retain corners of the camera or smart phone (not shown). In some embodiments receiver 40 is a screw-in camera mounting like those commonly used on camera tripods (not shown). In some embodiments mount 38 includes a swivel 44 and a connector sleeve 46. Sleeve 46 can include a slot 48 to allow sleeve 48 to be clipped onto rod 12. To prevent the sleeve 46 from sliding or twisting on rod 12, an anti-slip coating or material (not shown) can be included on the interior surface of sleeve 46. Sleeve 46 could also be fixedly attached to rod 12 using an adhesive, by bonding or welding.

Figure 4:
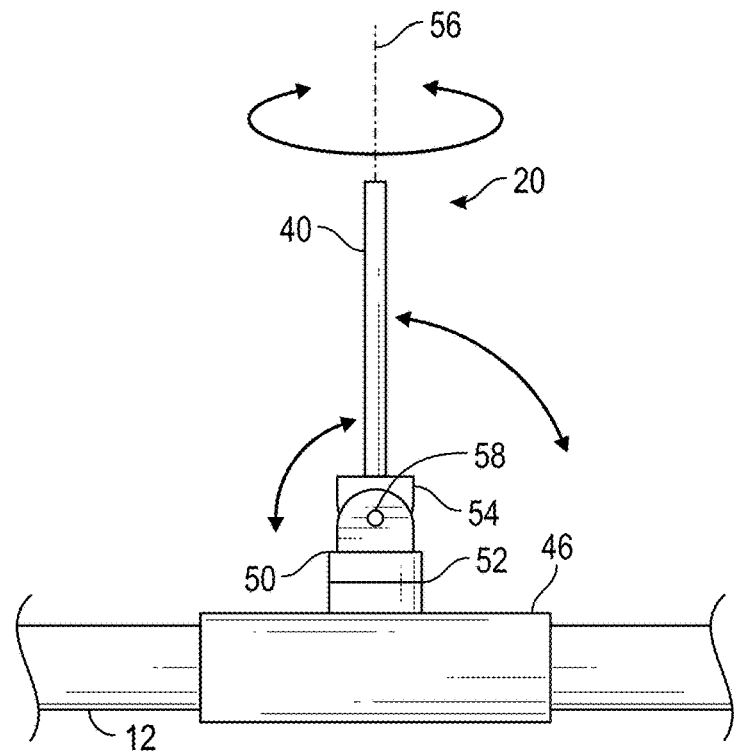
FIG. 4 illustrates one embodiment of a pan and tilt swivel connection of a camera mount of the camera mount and reflector system of the present invention.

FIG. 4 illustrates one embodiment of a pan and tilt swivel 50 of camera mount 20. Swivel 50 preferably includes a panning swivel 52 and a tilting swivel 54. Panning swivel 52 allows the receiver to rotate about axis 56 and tilting swivel 54 allows receiver 40 to rotate around axis 58. Axis 58 is preferably perpendicular to axis 56.

Figure 5:
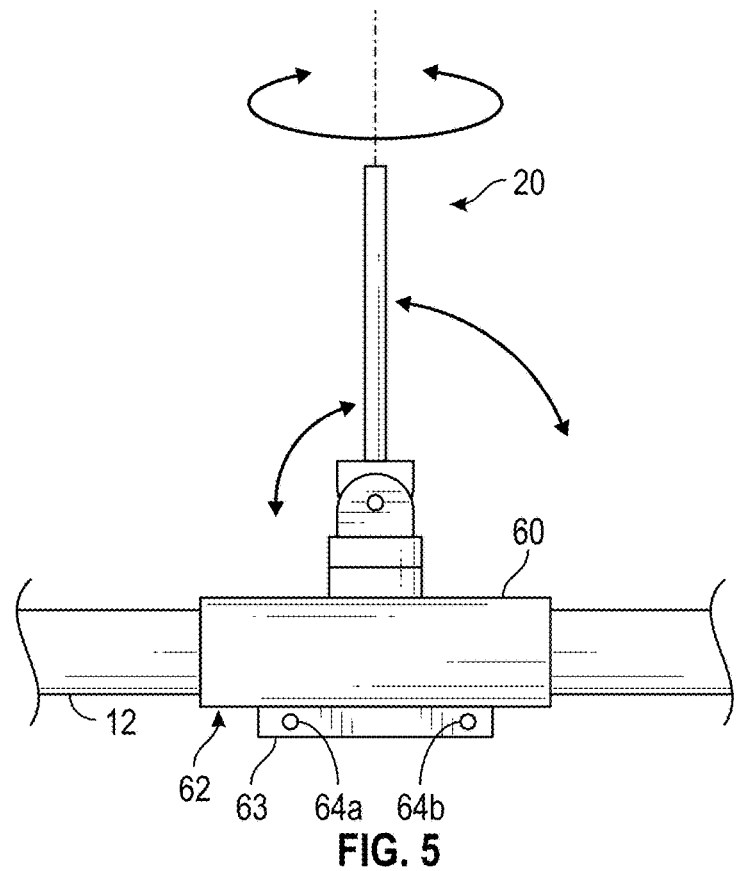
FIG. 5 illustrates an alternative connector of a camera mount of the camera mount and reflector system of the present invention.

FIG. 5 illustrates an alternative connector for a camera mount 20 of the camera mount and reflector system 10. Connector 60 includes a slot 62 allowing connector 60 to be clipped onto rod 12. Connector 60 also includes a pair of compression tabs 63 where one tab 63 is connected to connector 60 on each side of slot 62. Connector 60 is compressed onto rod 12 by at least one and preferably two compressing fasteners 64a and 64b. Fasteners 64 can be screws, bolts or other similar connectors known in the art.

Figure 6A:
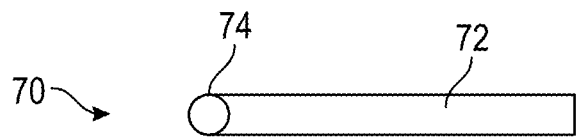
FIGS. 6a, 6b and 6c illustrate an alternative embodiment of the reflector of the camera mount and reflector system of the present invention in the collapsed, partially expanded and substantially expanded configurations, respectively.
Figure 6B:
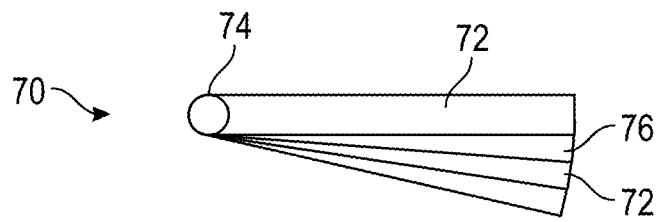
Figure 6C:
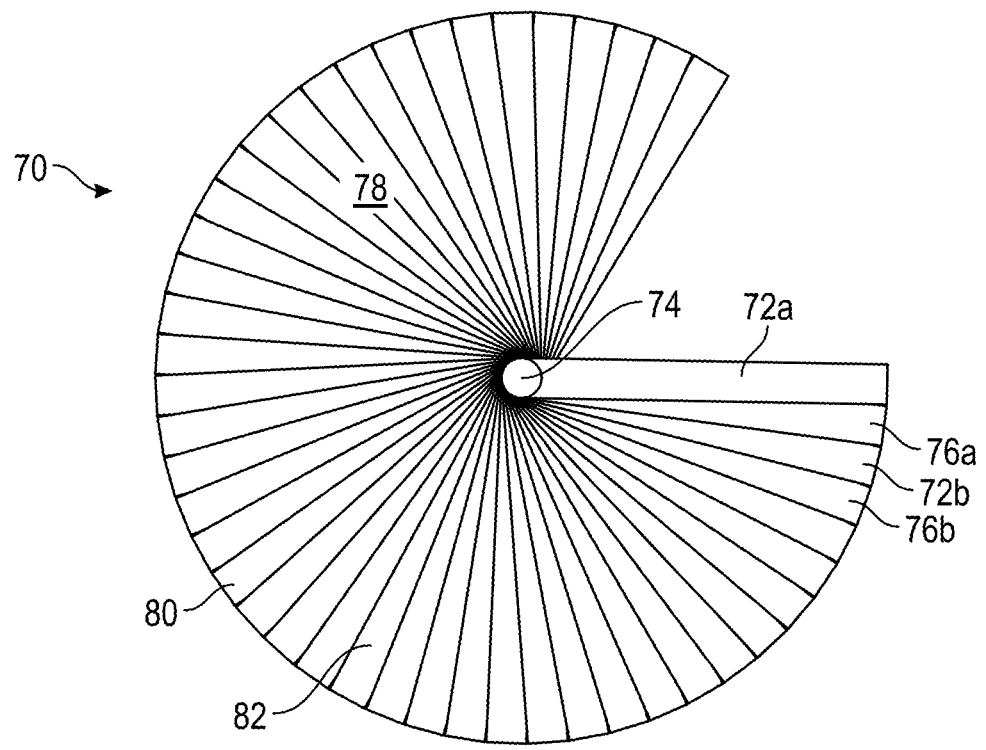

FIGS. 6a, 6b and 6c illustrate an alternative embodiment of the reflector in a collapsed, partially expanded and substantially expanded configurations, respectively. FIG. 6a shows reflector 70 in a collapsed configuration. FIG. 6b shows reflector 70 in a partially expanded configuration and FIG. 6c shows reflector 70 in a substantially expanded configuration. Reflector 70 includes a number of ribs or slats 72 which are connected to and pivot around a hub 74. Hub 74 is configured to be attached to the distal end of rod 12. As can be seen in FIGS. 6b and 6c, each slat 72 is connected to the next slat 72 by flexible material 76 such that it can be expanded like a paper fan into a complete circular disk reflector 70. When reflector 70 is connected to rod 12 reflector 70 has a proximal side 78 facing rod 12 and handle 18.

In the preferred embodiment surface 80 of proximal side 78 of reflector 70 is reflective to visible light. To achieve this reflectiveness slats 72 and flexible material 76 preferably have a reflective surface 80 comprising a reflective coating 82 made of materials like reflective paint or flexible plastic film, aluminized plastic or biaxially-oriented polyethylene terephthalate (PET) film. In the preferred embodiment one or more reflective coatings 82 are applied to proximal side 78. Preferably reflective coating 82 is flexible to allow the reflector 22 to collapse into its collapsed configuration.

Figure 7:
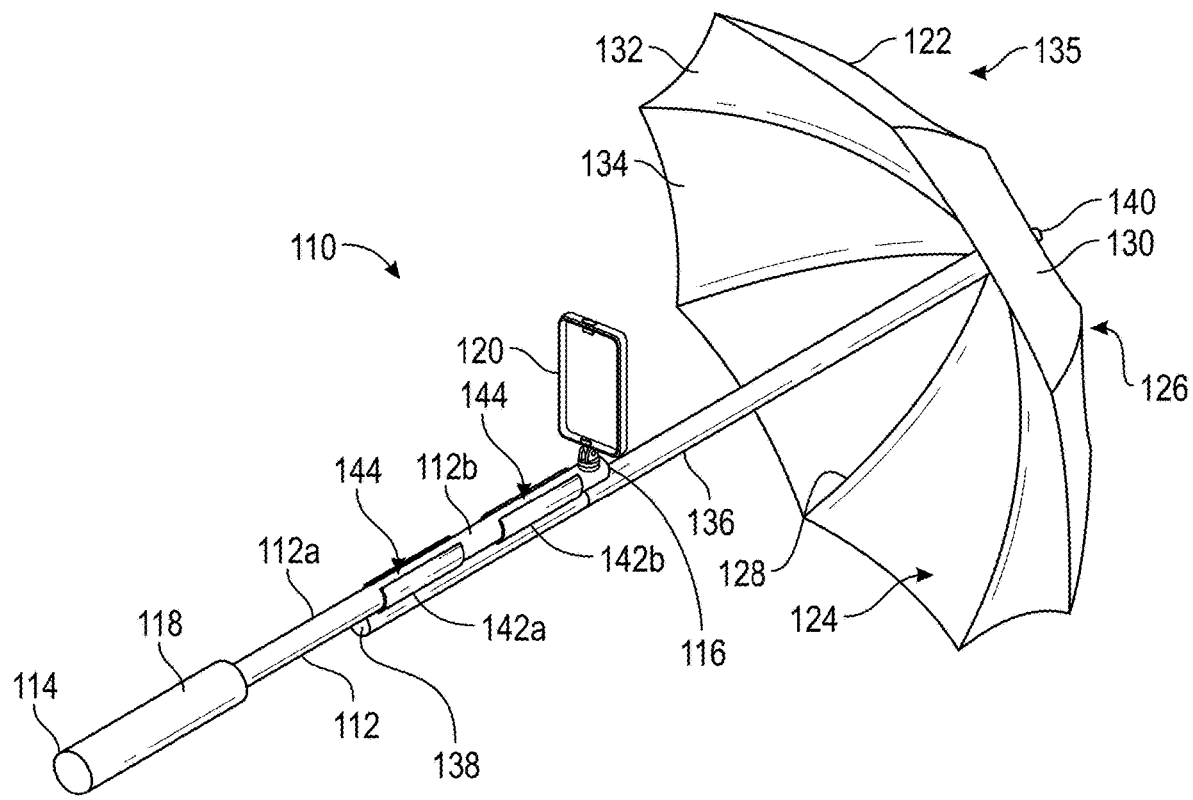
FIG. 7 illustrates an alternative embodiment of a camera mount and reflector system of the present invention showing the system in the fully expanded configuration.

FIG. 7 illustrates an alternative embodiment of a camera mount and reflector system 110 of the present invention showing the system in the expanded configuration. Reflector system 110 includes a rod member 112 which has a proximal end 114 and a distal end 116. Rod member 112 could be a solid or fixed length rod, but it is preferably a collapsible rod. In some preferred embodiments rod member 112 is hollow. In other preferred embodiments rod member 112 includes two or more nested or telescoping sections 112a, 112b. In this manner rod member 12 can have a collapsed configuration and an extended configuration such that the overall length of the rod member 12 is minimized when in the collapsed configuration. Those skilled in the art will appreciate that the telescoping rod member 12 could be replaced with other known collapsible structures known in the art without departing from the present invention.

In a preferred embodiment a handle 118 is attached to the rod member adjacent the proximal end 114 of the rod member 112. Handle 118 is configured to facilitate a user being able to grip and maintain control of the reflector system 110. Handle 118 can include other complimentary systems like a trigger system or a pairing/syncing system. These aspects will be discussed further below.

Preferably a camera mount 120 is attached to rod member 112 between the proximal end 114 and the distal end 116. It is preferable that camera mount 120 is located as far from the proximal end 114 as possible without interfering with placement and functionality of other structures and components. The camera mount 120 can be fixedly or removably attached to rod member 112 and will be described in more detail below.

Reflector system further includes a reflector member 135 which includes a reflector rod 136 having a proximal end 138 and a distal end 140. Attached to reflector rod 136 adjacent to distal end 140 is a reflector 122 having a proximal side 124 and a distal side 216. In the preferred embodiment, reflector 122 is umbrella-like with ribs 128 to provide structure and a flexible cover 30. Preferably, reflector 122 is configured to be collapsible and has a collapsed configuration and an expanded configuration. Preferably the structure and collapsing functionality are like those known to and used by those the skilled in the art for umbrellas. In the preferred embodiment the surface 132 of the proximal side 124 of reflector 122 is reflective to visible light. To achieve this reflectiveness the flexible cover 130 itself can have a reflective surface 132. In some embodiments cover 130 could be a reflective, flexible plastic film like aluminized plastic or biaxially-oriented polyethylene terephthalate (PET) film with a metallic coating. Alternatively, a reflective coating 134 can be applied to the surface of cover 130. In the preferred embodiment the cover 130 is made of cloth material having one or more reflective coatings 134 applied to the proximal side 124. Preferably the reflective coating 134 is flexible to allow the reflector 122 to collapse into its collapsed configuration.

Attached to proximal end 138 of reflector rod 136 is one or more connectors, preferably two connectors 142a, 142b. Connectors 142 releasably connect reflector rod 136 to rod member 112. Preferably connectors 142 are fixedly attached to reflector rod 136 and each includes a longitudinal slot 144 to receive and releasably retain rod 112 and are generally configured to receive and releasably grip onto rod 112. Reflector rod 136, reflector 122 and connectors 142 are parts of reflector member 135.

Figure 8:
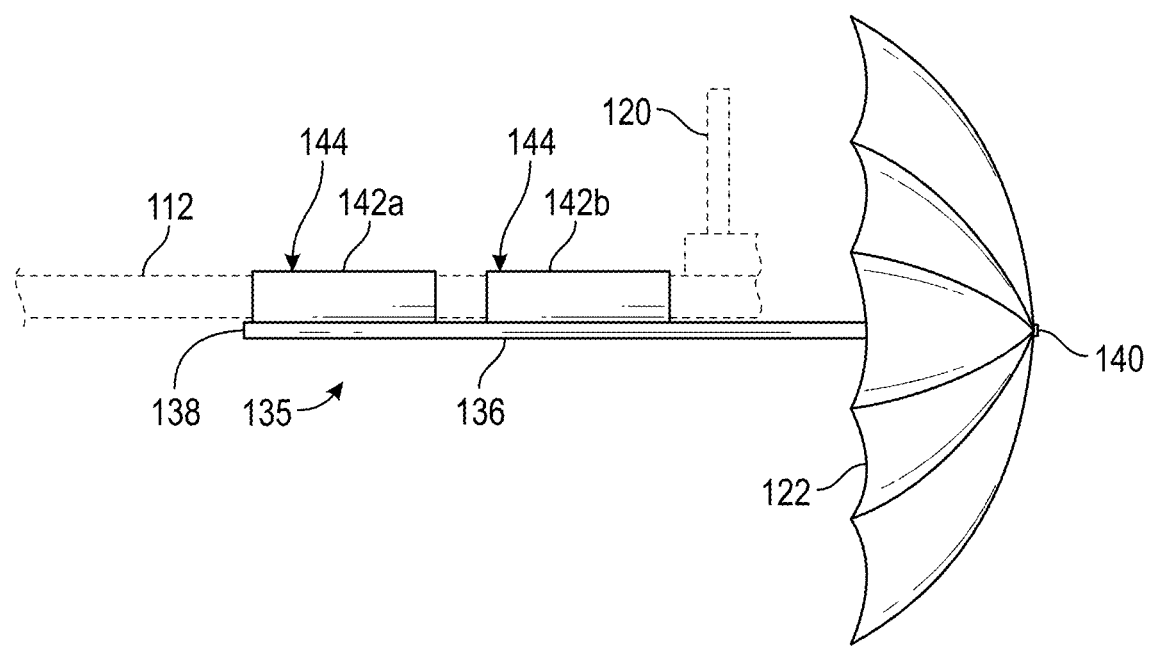
FIG. 8 illustrates the detachable reflector portion of the camera mount and reflector system of the embodiment shown in FIG. 7.

FIG. 8 illustrates the detachable reflector member 135 of the camera mount and reflector system of the embodiment shown in FIG. 7. Reflector member 135 is shown relative to rod 112 and camera mount 120 which are shown in phantom.

As noted above reflector systems 10 and 110 preferably include a triggering system used to direct the camera to take and store an image. Remote triggering systems are known in the art and are used in connection with cameras. In some embodiments the trigger system is incorporated in the handle of reflector system 10 and 110. In other embodiments the triggering system is incorporated into a stand-alone remote device housing. In either case the triggering system includes a button switch, a battery, a processor, and an RF transmitter. Preferably the transmitter is part of a transceiver capable of Bluetooth communication. To trigger the camera to take an image, the user presses the button which communicates with and sends a signal to the processor. The processor sends instruction to the transmitter to send an instruction to the camera to trigger the camera to take an image. In some embodiments the handle or the remote device housing includes a pairing or syncing button as is used to pair or sync devices for radio communication like used with systems using Bluetooth communications. In some embodiments the pairing/syncing system can include a battery, a processor, and an RF transmitter. In preferred embodiments the trigger system and the pairing/syncing system will share components like a battery, processor and/or transmitter, Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A handheld camera mount system comprising:
a rod member having a proximal end and a distal end, wherein the rod member comprises at least two telescoping sections and is configured to have a collapsed configuration and an extended configuration;
a handle attached to the rod member adjacent the proximal end;
a camera mount attached to the rod member between the proximal end and the distal end, wherein the camera mount is configured to receive and releasably retain a camera; and
a reflector member attached to the rod member adjacent to the distal end, wherein the reflector member is configured to have a collapsed configuration and an expanded configuration and is configured to allow the reflector member to be in the expanded configuration when the rod member is in the extended configuration and in the collapsed configuration when the rod member is in the retracted configuration.

2. The handheld camera mount system of claim 1, wherein the reflector member comprises a proximal side, a distal side and a reflective coating on the proximal side of the reflector member.

3. The handheld camera mount system of claim 1, wherein the reflector member comprises a collapsible rib structure wherein the rib structure supports a flexible cover.

4. The handheld camera mount system of claim 3, wherein the flexible cover has a proximal side, a distal side and a reflective coating on the proximal side of the flexible cover.

5. The handheld camera mount system of claim 1, further comprising a remote triggering system configured to provide radio communication with the camera.

6. The handheld camera mount system of claim 5, wherein the triggering system comprises a switch, a battery, a processor and a transmitter.

7. The handheld camera mount system of claim 5, wherein the remote triggering system is incorporated into the handle.

8. The handheld camera mount system of claim 5, wherein the remote triggering system is incorporated into a stand-alone housing.

9. A handheld camera mount system comprising:
a telescoping rod having a proximal end and a distal end;
a handle attached to the telescoping rod adjacent the proximal end;

a camera mount attached to the telescoping rod, wherein the camera mount is configured to receive and releasably retain a camera; and a reflector member connected to the telescoping rod, wherein the reflector member comprises a diffuser cover that diffuses light impinging a distal side of the diffusing cover.

10. The handheld camera mount system of claim 9, wherein the diffuser cover is adapted to control an amount of light that passes through the diffuser cover.

11. The handheld camera mount system of claim 9, wherein the reflector member comprises a diffuser cover adapted to control a color spectrum of light that passes through the diffuser cover.

* * * * *